United States Patent
Pelland et al.

(10) Patent No.: US 8,638,906 B1
(45) Date of Patent: *Jan. 28, 2014

(54) AUTOMATED APPLICATION TESTING

(71) Applicant: Convergys Customer Management Delaware LLC, Cincinnati, OH (US)

(72) Inventors: David M. Pelland, Bolton, MA (US);
Richard Burk, Corpus Christi, TX (US);
Jeffrey D. Kosa, Pelham, NH (US);
Blaise T. Lapinski, Wylie, TX (US)

(73) Assignee: Convergys Customer Management Delaware LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,983

(22) Filed: Oct. 29, 2012

Related U.S. Application Data

(63) Continuation of application No. 12/839,627, filed on Jul. 20, 2010, now Pat. No. 8,325,880.

(51) Int. Cl.
*H04M 1/24* (2006.01)
*H04M 3/08* (2006.01)
*H04M 3/22* (2006.01)

(52) U.S. Cl.
USPC .................. 379/10.03; 379/10.01; 379/15.01; 379/26.01; 379/27.04; 379/29.02

(58) Field of Classification Search
USPC ................ 379/1.01, 1.02, 9.01, 10.01, 10.02, 379/10.03, 15.01, 26.01, 27.02, 27.04, 379/27.08, 29.07
See application file for complete search history.

(56) References Cited

U.S. PATENT DOCUMENTS 7,590,542 B2 * 9/2009 Williams et al. ........... 704/270.1
2003/0212561 A1 * 11/2003 Williams et al. ........... 704/270.1
2004/0008825 A1 * 1/2004 Seeley et al. ............... 379/32.01
2006/0230410 A1 * 10/2006 Kurganov et al. ............ 719/311

OTHER PUBLICATIONS

WinRunner® 7.0 Tutorial, Online Guide, Copyright 1994-2000 by Mercury Interactive Corporation. (193 pages) Accessed Sep. 27, 2013 at http://students.depaul.edu/~slouie/wr_tut.pdf.
Mercury QuickTest Professional, Tutorial Version 8.0, Copyright 2004 by Mercury Interactive Corporation. (111 pages) Accessed Sep. 27, 2013 at http://thinh1808.files.wordpress.com/2008/03/qtp-tutorial.pdf.
Silktest Getting Started Tutorial: Outline, as available on Aug. 12, 2007, (2 pages) Accessed Sep. 27, 2013 at http://wayback.archive.org/web/20070812134204/http://sqa.fyicenter.com/SilkTest_tutorial/.
Rational software, Getting Started Guide for IBM Rational Robot, as available Mar. 6, 2009, (3 pages) Accessed Sep. 27, 2013 at http://wayback.archive.org/web/20090201000000*/http://www.ibm.com/developerworks/rational/library/content/03July/getstart/robot/Robot_GSG.pdf.

* cited by examiner

*Primary Examiner* — Binh Tieu
(74) *Attorney, Agent, or Firm* — Frost Brown Todd LLC

(57) ABSTRACT

Voice user interfaces can be tested using test scripts generated by traversing a graph using a recursive search technique, such as recursive depth first search. Test data to accompany the test scripts can be generated by treating conditions in states of the interface as business rules, and fully exercising each state during traversal of the graph. Actual testing can be performed in a faster than real time manner by providing simulated input from test scripts, as opposed to requiring actual input from human testers. The interfaces can also be tested using a gatekeeper intermediary which provides for easy transitions between testing and deployment.

14 Claims, 4 Drawing Sheets

AUTOMATED APPLICATION TESTING

CROSS REFERENCE TO RELATED APPLICATIONS

This application is a continuation of, and claims priority from, U.S. patent application Ser. No. 12/839,627, filed Jul. 20, 2010, and having the same title and inventors as the current application. The disclosure of that application is hereby incorporated by reference in its entirety.

FIELD OF THE INVENTION

The disclosure set forth herein can be used to implement technology in the field of automated system testing.

BACKGROUND

Voice user interface applications have become commonplace, as businesses seek to communicate with their customers over a medium that customers are comfortable with (voice) while minimizing the resources necessary to support that communication (primarily operators). While there are well developed technologies for supporting these applications once they are operational (e.g., VXML), the technologies used to create these applications, particularly in terms of testing, are not nearly so advanced. Ironically, given the labor saving intent of most voice using interface applications, in many cases testing is performed with actual human testers, rather than using an automated process at all. Further, even in cases where there is some level of automation in the testing process, this automation is generally performed only on the fully deployed system (e.g., robotic callers interacting with a deployed interactive voice response system). This is inefficient, because often the design of an application will be finished before it is ready to be deployed, and so testing must wait until the deployment process is complete, rather than being able to proceed at an earlier stage. Additionally, automation is typically performed using scripts generated by hand, rather than from the original design. Improvements are needed to allow the scripts to be generated from the original design—eliminating errors in manual translation from the specification to the script. As a result, there is a long felt, but unmet need in the art for improvements in the technology that can be used in testing voice user interface applications.

SUMMARY

The disclosed technology can be implemented in a variety of manners. For example, based on the disclosure set forth herein, one of ordinary skill in the art could implement a method comprising using a computer readable medium to store a set of data representing a voice user interface comprising a plurality of states and creating a set of test scripts and a set of test data corresponding to the voice user interface. Similarly, the disclosure set forth herein could be used to implement a machine comprising an interactive voice platform and a voice server, where the interactive voice platform is configured to execute a voice user interface application, generate voice processing requests, send evaluation requests to a gatekeeper, and receive responses to the voice processing requests. In such a machine, the gatekeeper could be configured to determine if an evaluation request is made during a live interaction or a test interaction, and, depending on the type of interaction, send a response to the evaluation request based on test data, or send a response to the evaluation request based on communication with a set of back end systems. Of course, other types of machines, compositions of matter, articles of manufacture, and methods could be performed or implemented without undue experimentation by those of ordinary skill in the art based on the disclosure set forth herein. Accordingly, the summary provided above should be treated as illustrative only, and not limiting.

DETAILED DESCRIPTION

Aspects of the following disclosure can be utilized to generate test cases, generate user interface code, automatically execute the test cases, and simulate back-end data integration based on a voice user interface (VUI) design. While the following disclosure includes a number of concrete examples of how the inventors' technology can be implemented, it should be understood that those examples are provided for illustrative purposes only, and that numerous variations on the disclosed examples will be immediately apparent to one of ordinary skill in the art, and could be implemented without undue experimentation based on the disclosure set forth herein. Accordingly, the following disclosure should be treated as illustrative only, and should not be treated as limiting on the scope of protection accorded by this document, or by any document which is related to this document.

Figure 1:
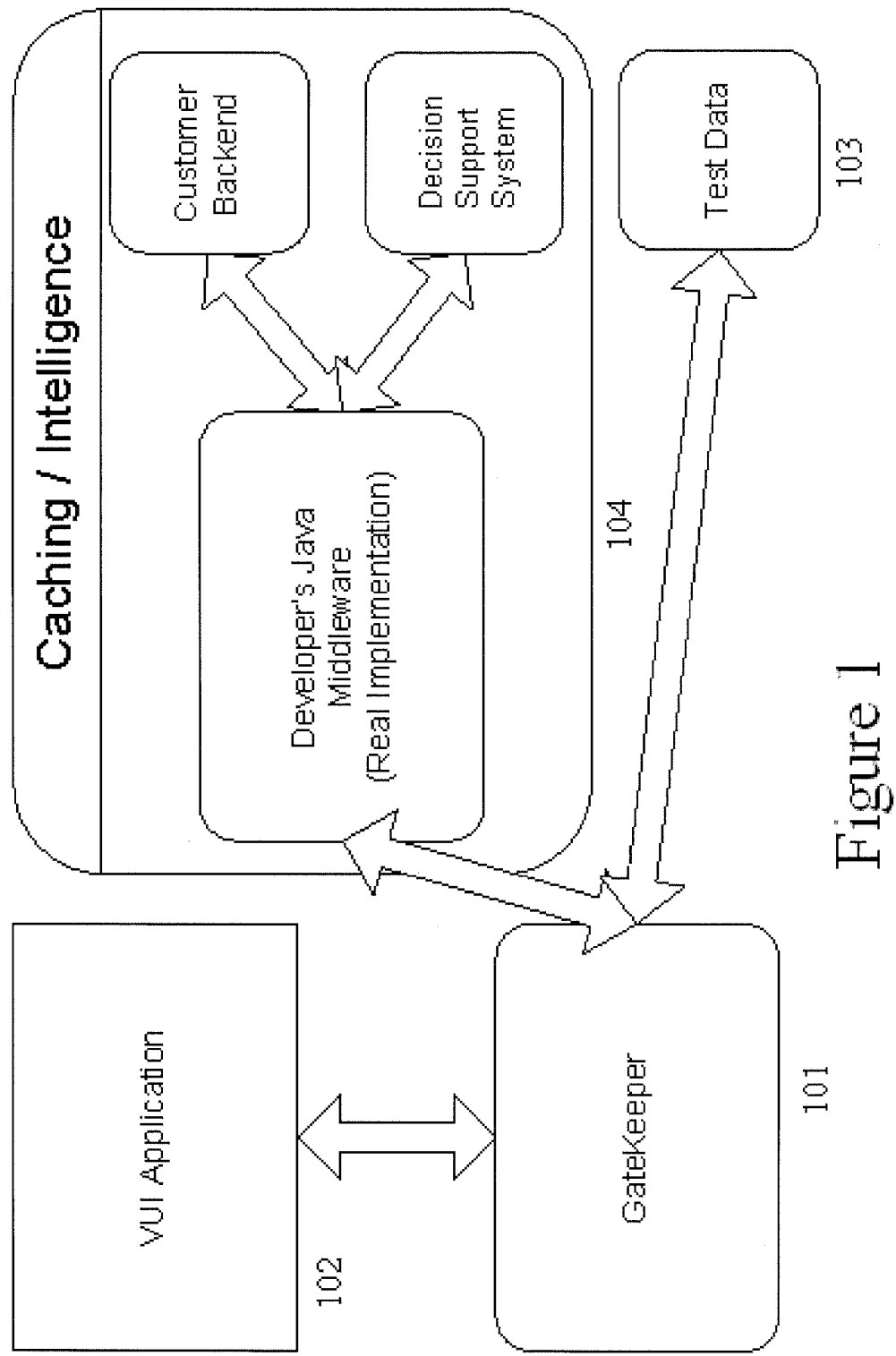
FIG. 1 depicts an architecture in which an intermediary component, referred to as a gatekeeper, is positioned between a voice user interface application and various data sources that can be used by the voice user interface application during testing and/or deployment

Turning now to FIG. 1, that figure depicts an architecture in which an intermediary application, referred to as a gatekeeper [101], is positioned between a voice user interface application [102], and various data sources that can be used by the voice user interface application during testing and/or deployment. Using a gatekeeper [101] such as shown in FIG. 1, the voice user interface application [102] can be provided with a simple, consistent interface that can be used to evaluate business rules (or perform other necessary data manipulations, such as data reads and/or writes) both during testing and when the application [102] is actually deployed. To illustrate how this might work, consider the code snippets of tables 1 and 2:

TABLE 1

Requesting a Business Rule During Deployment

/*Initially, the VUI Application makes a
request for a business rule "Customer
Called In Before":
*/
GateKeeper(CustomerCalledInBefore);
/*The GateKeeper makes a call to
evaluate the business rule:
*/
dataDip(CustomerCalledInBefore);
/*The developer's Java Middleware then
interacts with appropriate systems such
as a customer backend database and a
decision support system to determine a
response. For example:
*/

TABLE 1-continued

Requesting a Business Rule
During Deployment

```
custObject = customerWsdl...;
bool = custObject.lastCall < today − 24
hours;
return bool;
```

TABLE 2

Requesting a Business
Rule During Testing

```
/*Initially, the VUI application makes a
request for a business rule "Customer
Called In Before":
*/
GateKeeper(CustomerCalledInBefore);
/*The GateKeeper retrieves a value for the
business rule from the test data:
*/
return testData(CustomerCalledInBefore);
```

As shown in tables 1 and 2, with the gatekeeper [101], the voice user interface application [102] can evaluate the business rule (in this case, whether the customer has called in before) during both deployment and testing using a single call (GateKeeper(CustomerCalledInBefore)). At deployment, the gatekeeper [101] could respond to such a call by placing an http request using a request ID indicating the rule to be evaluated, and any arguments that need to be passed to the middleware [104] (in some embodiments, this could allow a single http request to be used for multiple types of request). During testing, the gatekeeper [101] could respond using dummy data (which might be stored in a separate testing database [103], or in a file which could be accessed directly by the gatekeeper [101] itself). The gatekeeper [101] could be easily switched between testing and deployment modes by providing it with a map containing an indexed list of all of the business rules and data requests that are called out by the voice user interface application [102]. The indexed list could specify, for each request, whether to use test data (and, in some implementations, might specify what data to use) or to pass a request to the middleware [104]. Further, in some implementations, use of such a map could allow a gatekeeper [101] to identify and respond to situations when it was configured for testing but is actually being used in a deployment setting. For example, in some cases, a map could have data for different test cases identified on a per-ANI basis. In the event that a gatekeeper [101] is given a request associated with an ANI that is not identified in the test map, or for which it was not provided with test data, the gatekeeper [101] could automatically switch to deployment mode, thereby allowing the voice user interface application [102] to continue working despite the incorrect configuration. As a result, using a gatekeeper [101] could not only help speed development (by enabling testing of an application to take place in parallel with implementation of the middleware [104] used when that application is deployed), but can also provide a useful failsafe for dealing with configuration problems that could take place as a result of, for example, operator error.

Figure 2:
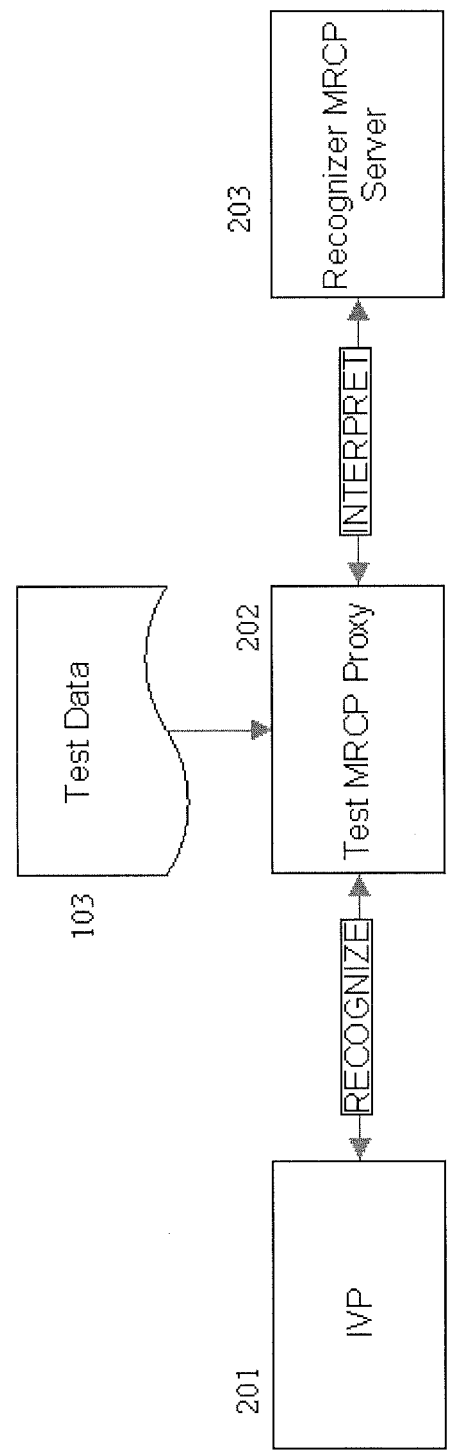
FIG. 2 depicts an architecture which can be used in testing an interactive voice platform.

Of course, the intermediary approach described above is not limited to being implemented in a gatekeeper [101] that could handle data requests. For instance, it is also possible that using intermediaries can speed testing by providing automatic responses to prompts that would normally require user input. As an illustration of this, consider the diagram of FIG. 2. In FIG. 2, testing of an interactive voice platform [201], such as an interactive voice response system running a voice user interface application [102], takes place using test data [103], a media resource control protocol server [203], and a media resource control protocol proxy server [202] in communication with the interactive voice platform [201]. During deployment, the interactive voice platform [201] would generally be connected directly to the media resource control protocol server [203], and would send requests to that server to recognize statements made by a caller (e.g., translating spoken input into a more manageable form, such as text), and interpret those statements (e.g., matching them with entries in a grammar that determines what actions the voice user interface application will take). During testing, as shown in FIG. 2, this setup is modified by having the interactive voice platform [201] connected to the proxy server [202] (e.g., by changing configuration information in the platform to sent requests to the IP address and port of the proxy server, rather than the MRCP server itself). The proxy server [202] would then receive the recognition requests from the interactive voice platform [201], and instead of actually performing any type of recognition tasks (e.g., speech recognition), it could "fake" the recognition by taking test data [103] and providing that to the MRCP server [203] for interpretation. In this way, the testing of the voice user interface application [102] could be accelerated, because the proxy server [202] could simply keep count of how many recognition requests had been made, and provide the appropriate input as indicated by a stored test script, rather than waiting for (and recognizing) a spoken input from a user.

Figure 3:
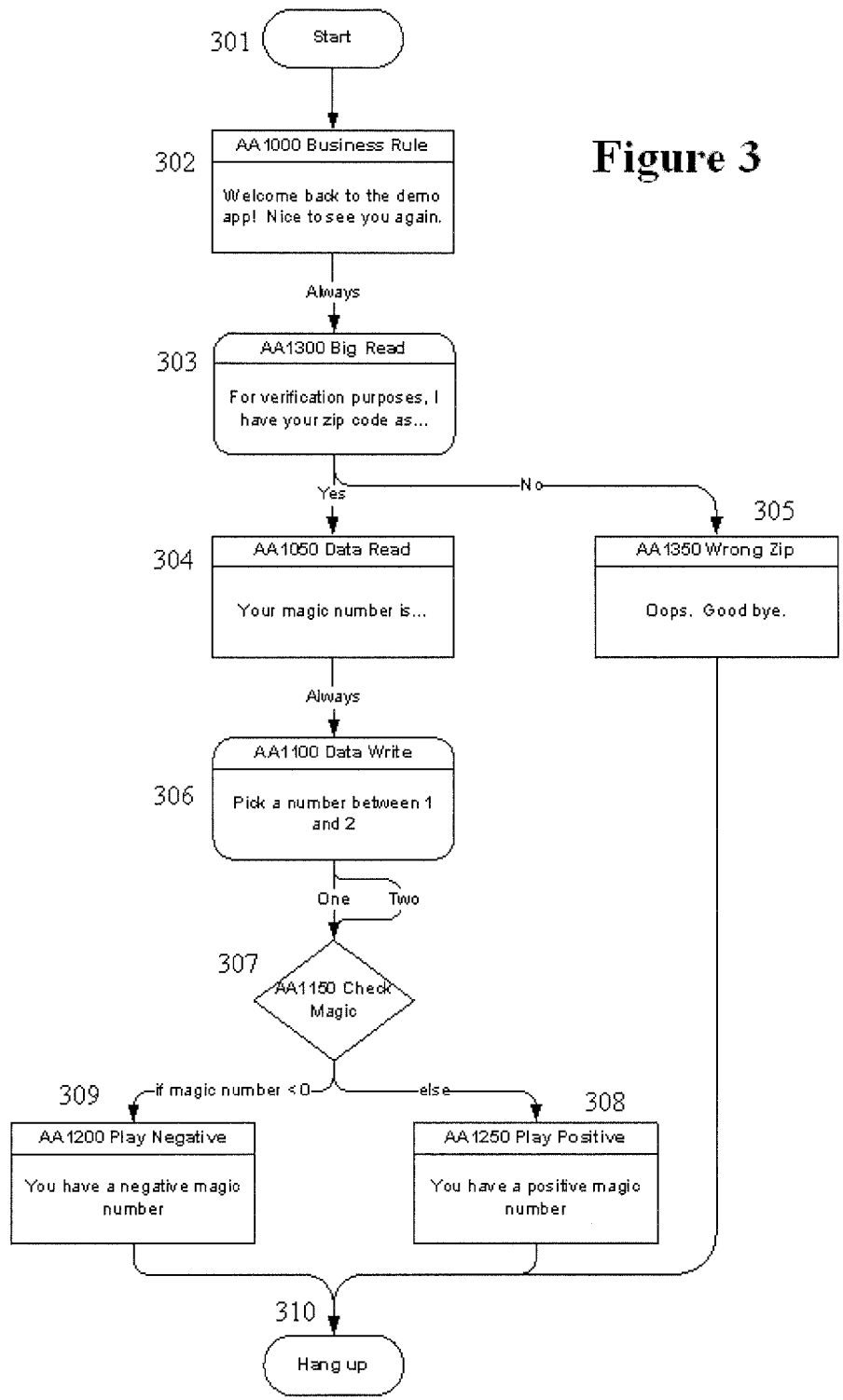
FIG. 3 depicts a sample dialog.

Turning now to the sample dialog of FIG. 3, that sample dialog is provided to help illustrate how information that could be used to test a voice application (e.g., test data used by a proxy MRCP server or a gatekeeper) could be generated. The sample dialog of FIG. 3 presents a trivial case of an interaction which could take place between a user and an automated system. Essentially, the interaction starts [301] when the user calls in. It automatically transitions to the first state [302] for the system, which could be, for example, play a greeting prompt for the user. The system then verifies the user's zip code [303]. If the zip code is incorrect, there is a transition to an error state [305] and the transaction terminates [310]. Otherwise, the system plays a "Your magic number is . . . " prompt [304], and asks the user to pick a number between 1 and 2 [306]. The number is checked [307], and the system transitions to a positive number state [308] or a negative number state [309] depending on the value of the magic number. After the user has been told that he or she has a positive (or negative) number, the transaction terminates by transitioning to the hang up state [310]. A sample test script which could be used in the testing of the application of FIG. 3 is provided in table 3.

TABLE 3

Sample test script and data for the application of FIG. 3.

```
TESTID: 1756
TESTDATA: "Called In Previously"=True
TESTDATA: "ZipCode"=01740
STEP 1: EXPECT STATEID AA1000_Business_Rule
STEP 2: EXPECT PROMPTID AA1000_i_1
STEP 3: EXPECT STATEID AA1300_Big_Read
STEP 4: EXPECT PROMPTID AA1300_i_1
STEP 5: EXPECT DATA 01740
STEP 6: EXPECT PROMPTID AA1300_i_2
STEP 7: EXPECT ASK
STEP 8: INPUT "No"
STEP 9: EXPECT STATEID AA1350_Wrong_Zip
```

TABLE 3-continued

Sample test script and data for the application of FIG. 3.

STEP 10: EXPECT PROMPTID AA1350
STEP 11: EXPECT DISCONNECT

In the test script of table 3, the first entry, TESTID: 1756, provides a unique identifier for the script, which can be used for error reporting in the event that the interaction with the system does not proceed as expected. The second two entries, TESTDATA: "Called In Previously"=True and "Zip-Code"=01740, provide data that is used to determine how the interaction with the system proceeds. The final entries describe the expected actions by the system given the data provided. After a test is run, these entries can be compared with an audit log generated by an application being tested to make sure that the application's behavior is consistent with its design. For example, after testing the voice user interface application of FIG. 3 with the script of table 3, the expected audit log should show that the transaction took place as indicated in table 4:

TABLE 4

Sample audit log for running the application of
FIG. 3 with the script of table 3.

TESTID: 1756
TIMESTAMP: September 21, 2009
STEP 1: STATEID AA1000_Business_Rule
STEP 2: PROMPTID AA1000_i_1
STEP 3: STATEID AA1300_Big_Read
STEP 4: PROMPTID AA1300_i_1
STEP 5: DATA 01740
STEP 6: PROMPTID AA1300_i_2
STEP 7: ASK
STEP 8: INPUT "No"
STEP 9: STATEID AA1350_Wrong_Zip
STEP 10: PROMPTID AA1350
STEP 11: DISCONNECT In the audit log of table 4, because all of the actual data collected for the steps of the transaction matched the EXPECT data in the script, the system would indicate that the script with TESTID 1756 was successfully passed. If this was not the case (e.g., if one of the values in the audit log had not matched what was expected in the script), then that log could have been flagged as indicating an error, which would later be reviewed by a human so that the operation of the system could be corrected. Of course, other error handling methods could also be used, such as automatically generating a plain text error report for export to an error tracking tool (e.g., Bugzilla, AdminiTrack).

Moving on from the discussion of the illustrative script and audit log from tables 3 and 4, it should be understood that real systems would likely require much more extensive testing than could be provided by the single script of table 3. Indeed, in order to test an application, test scripts and data will preferably be generated which cover each of the following situations: each goto transition is exercised; each application prompt is played; every business rule's true and false paths are exercised; every data element is played; every state is reached; every sub-dialog (entering from and returning to) is exercised; every confirmation is fired; retries and timeouts are hit on every interaction state; all grammar options (speech and DTMF, as appropriate to an application) are exercised; and every global (e.g., OPERATOR, MAIN MENU) is exercised at every interaction state. To illustrate how this could be achieved, consider table 5, which is a state table corresponding to state AA1000 from FIG. 3.

TABLE 5

State table corresponding to state AA1000 from FIG. 3.

| AA1000_Business_Rule | Play Prompt |
|---|---|
| Previous State<br>Start | |
| Prompts | |
| Conditions and Wording | Prompt ID |
| if caller called IVR previously<br>   Welcome back to the demo app!<br>   Nice to see you again.<br>else<br>   Welcome to the demo app! | aa1000_i_1<br><br><br><br>aa1000_i_2 |
| Condition    Action | |
| Always    Go To: AA1300_Big_Read | |
| Special Settings<br>Developer Notes | |

As shown in table 5, depending on whether the caller previously called the fictitious IVR executing the application of FIG. 3, state AA1000 would have different behaviors, either playing prompt aa1000_i_1 or prompt aa1000_i_2. Thus, in order to play all prompts, two test cases could be generated, one with TESTDATA indicating that the caller had called into the IVR previously (e.g., as shown in table 3), and one with TESTDATA showing that the caller had not called in previously. An even larger number of test cases would be generated to handle interaction states. To illustrate, consider table 6, which is a state table corresponding to state AA1100 from FIG. 3.

TABLE 6

State table corresponding to state AA1100 from FIG. 3.

| AA1100_Data_Write | | Interaction |
|---|---|---|
| Previous State<br>AA1050_Data_Read | | |
| Prompts | | |
| Type | Conditions and Wording | Prompt ID |
| Initial /<br>Retry 1 /<br>Timeout 1 | Pick a number between 1 and 2 | aa1100_i_1 |
| wrong | That's not between 1 and 2 | aa1100_i_2 |

TABLE 6-continued

State table corresponding to state AA1100 from FIG. 3.

| Option | Vocabulary | DTMF | Condition-Action | Confirm? |
|--------|-----------|------|------------------|----------|
| One | One | 1 | play wrong<br>magic number = magic number + 1<br>write out magic number<br>Go To:AA1150_Check_Magic | Never |
| Two | Two | 2 | play wrong<br>magic number = magic number − 1<br>write out magic number<br>Go To:AA1150_Check_Magic | Never |

Confirmation Prompts

| Option | Wording | | | Prompt ID |
|--------|---------|--|--|-----------|

Special Settings
Developer Notes

To exercise a state such as represented by table 6, multiple scripts would be generated to ensure that each prompt type is played (i.e., the Initial, Retry 1, Timeout 1, and Wrong prompt types). Similarly, multiple scripts could be generated so that the system would be tested with DTMF inputs of both 1 and 2. Further, in cases where a user input is in the form of speech, rather than DTMF input, scripts could also be generated with each of the inputs which would be expected to be included in the recognition grammar used in a state, as well as various outside inputs to test no match conditions. Additionally, in some implementations, the number of test scripts could be increased still further, by duplication for each downstream state in an application. For instance, if four test scripts are needed to exercise state 1, and four test scripts are needed to exercise state 2, then there could be 4×4=16 test scripts generated to fully exercise both states. Alternatively, in some implementations, test scripts could be generated so that, once a state was completely exercised, the script would terminate (e.g., provide a HANGUP message), rather than proceeding to exercise the internals of another downstream state. Of course, it should be understood that other approaches to optimizing the efficiency of testing will be immediately apparent to those of ordinary skill in the art, and that the approaches described above are intended to be illustrative only, rather than limiting on the scope of the protection accorded by this document or any related document.

In order to create test scripts, a graph of an application, such as shown in FIG. 3, can be traversed using a search algorithm (e.g., recursive depth first search) which would move through the individual nodes in the graph. Using this approach, the following paths could be created for the application of FIG. 3:

TABLE 7

Test paths for the application of FIG. 3.

AA1000▶AA1300▶AA1050▶AA1100▶AA1150▶AA1200 [path 1]

AA1000▶AA1300▶AA1050▶AA1100▶AA1150▶AA1250 [path 2]

AA1000▶AA1300▶AA1050▶AA1100▶AA1150▶AA1200 [path 3]

AA1000▶AA1300▶AA1050▶AA1100▶AA1150▶AA1250 [path 4]

AA1000▶AA1300▶AA1350 [path 5]

Note that, in table 7, paths 1 and 3 are identical, and paths 2 and 4 are identical. This is a reflection of the fact that, in some implementations, the paths could be created so that each transition from one state to another is represented by at least one path. Accordingly, since there are two possible transitions between states AA1100 and AA1150, in a recursive depth first search, there would be two sets of paths which, purely from the standpoint of the states traversed by those paths, would appear to be identical. A pseudo-code representation of an algorithm which could automatically create those paths is set forth below:

```
main( )
{
    String dummy;
    Traverse(getStartState( ), dummy);
}
Traverse(State current_state, String previous_path)
{
    strcat(previous_path, current_state.getID( ));
    for(int counter=0; counter<current_state.numTransitions( ); counter++)
    {
        Traverse(current_state.Transition(counter), previous_path);
    }
    if(current_state.numTransitions( )==)
    {
        output(previous_path);
    }
}
```

Of course, rather than simply outputting the paths being traversed, a real system would be likely be implemented to output scripts which would exercise each state as those states are reached in the traversal. Similarly, in a real system there would generally be some kind of logic included which could detect and respond to looping conditions. For example, there could be data kept for each state which would measure the number of times that state was entered, and what state it was entered from. In such a case, if a state was entered more than a set number (e.g., 3) of times from the same previous state, the transition could be treated as a loop, and dealt with appropriately (e.g., a HANGUP could be added to that path to prevent it from extending to infinity). Additionally, in a real system, there would likely also be provisions made for dealing with subdialogs. For instance, there could be data stored which would remember the calling location when a subdialog is invoked, so that the traversal could "return" to the correct place once the subdialog had been completed. As an example of a further type of additional logic that would likely be included in a real system, in a real system, the individual states would likely have transitions not only to the states that follow them in the application, but also to states that could be entered using global inputs (e.g., MAINMENU, OPERATOR). Other variations and enhancements are also possible, depending on the nature of the processing to be performed in a real system. For example, as set forth below, different systems could use a variety of approaches to handling conditional statements. As a result, it should be understood that the particular optimizations and techniques described are intended to be treated as illustrative only, and not limiting on the scope of protection accorded by this document, or by any document claiming the benefit of this document.

Turning now to the handling of conditions, there are multiple approaches that can be taken to addressing conditions in situations where they are present. In general, conditions in a voice user interface design will be entered by the designer as unrestricted text representing a situation that the designer thinks is significant to the interaction being handled by an application. While this provides substantial flexibility for the designer, it can make handling those conditions difficult, at least relative to handling more structured and uniform information, such as source code for a computer program. To address this difficulty, one approach is to simply treat all conditions as business rules which are either true or false. Using this approach, a condition like "if balance is greater than five dollars" could be handled by creating two different TESTDATA entries, one where "Balance is Greater Than Five Dollars" is true, and one where it is false, without considering the underlying meaning of the rule (e.g., by creating a variable called balance, and setting it to a value which is or is not greater than five dollars). Using this approach, creating scripts to exercise the internals of a state (at least with respect to creating TESTDATA to determine if conditional prompts are functioning correctly) could be performed using an algorithm such as set forth in the following pseudo-code:

```
Exercise(State input_state, Script current_script)
{
    Script dummy_script;
    Condition dummy_condition;
    for(int counter=0; counter<input_state.numConditions( );
counter++)
    {
        dummy_script=current_script;
        dummy_condition=input_state.getCondition(counter);
        dummy_script.addTestData(dummy_condition, true);
        dummy_script.addStep(input_state.getPrompt(dummy_
            condition, true));
        dummy_script.addStep("HANGUP");
        global_scripts.addScript(dummy_script);
        dummy_script=current_script;
        dummy_script.addTestData(dummy_condition, false);
        dummy_script.addStep(input_state.getPrompt(dummy_
            condition, false));
        dummy_script.addStep("HANGUP");
        global_scripts.addScript(dummy_script);
    }
}
```

Of course, it should be understood that, in a real system exercising of conditions would likely be performed with a substantially more complex algorithm than that set forth above. For instance, a real algorithm would likely check to make sure that test data being added was not duplicative of data which had previously been added in the traversal path taken to reach the state being exercised (e.g., by adding a check before adding the appropriate script to the global_scripts data structure). A real algorithm could also include truth tables to make sure that all possible combinations of values have been exercised. For example, if a given script uses variables A and B, the path could be tried using values A=t, B=t, then A=f, B=t, then A=t, B=f, then A=f, B=f, to test all possible combinations. Similarly, a real algorithm would also likely include some kind of logic to verify compatibility between scripts created in exercising a state and the path traversed to reach that state. To illustrate, consider the case in which state A, which has an initial prompt that requires "New Customer" to be true, transitions to state B, which has at least one prompt that is played only if "New Customer" is false. If the traversal path to B through A is associated with "New Customer" as being true, then state B could not create a test script with "New Customer" as false, and therefore could not test the prompt that required "New Customer" to be false. To address this issue, it is possible that some implementations could keep track of whether states which have been visited during script creation had been fully exercised, and could also keep track of which state in a traversal path sets a value which prevents a state from being fully exercised. This would allow the script creation algorithm to backtrack so as to ensure completeness. For example, in the case of states A and B described above, this could take place according to the following series of steps:

1. Initial state S transitions to state A
2. State A sets TESTDATA "new customer" to true to test a prompt playing
3. State A then transitions to state B
4. State B does some stuff but cannot play prompt P because its condition says "new customer" is not true.
5. The recursive algorithm tracks that prompt P has not been played
6. The algorithm backtracks to State A and eventually State S (which pops the TESTDATA set in step 2 off the stack)
7. Because the algorithm indicates B is not completely exercised, it goes back through A. Noticing that A's prompts are all exercised, the algorithm transitions to B without changing any test data.
8. The algorithm can now set TESTDATA "new customer" to false and exercise the remaining prompts for state B Another source of complexity which could be present in a real system is logic which could take into account the meaning of conditions, rather than simply treating everything between a condition word and a delimiter as a true or false business rule. For example, in some cases, processing could be performed on conditions to identify predefined strings, such as logical operators (e.g., AND, OR, NOT, PARENTHESES), and keywords (e.g., words which are consistently used to reflect common relationships in conditions, such as CAMEFROM, or the names of states). In such an implementation, only those portions of a condition which did not match one of the predefined strings would be treated as business rules. To illustrate, using this approach, the condition "if came from MM1000 and delinquent and has called in recently" could be parsed as shown in table 8:

TABLE 8

Illustrative parsing of "if came from MM1000 and delinquent and has called in recently."

| Token Type | Value |
| --- | --- |
| Keyword | CAMEFROM |
| State name | MM1000 |
| Logical Operator | AND |

TABLE 8-continued

Illustrative parsing of "if came from MM1000 and delinquent and has called in recently."

| Token Type | Value |
| --- | --- |
| Business Rule | "Delinquent" |
| Logical Operator | AND |
| Business Rule | Has Called In Recently |

Yet further complexity could be added by implementing a system to recognize additional types of operators (e.g., conditionals, such as GREATER THAN, LESS THAN, EQUAL TO) and/or to recognize variables which could be evaluated in the conditions. Other types of variations, such as application of various natural language processing and artificial language processing (e.g., use of a compiler to process source code into object code) techniques are contemplated by the inventors and will be immediately apparent to those of ordinary skill in the art. Accordingly, the examples set forth above should be understood as being illustrative only, and not limiting.

As an alternative to the above, some systems might handle conditions by controlling how those conditions are created, rather than allowing voice user interface designers to create conditions as unrestricted text as discussed above. For example, in some cases, VUI designers might be provided with a tool which, when it detects that a designer has entered a condition which may be related to a previous condition, will offer a suggestion to the designer. To illustrate, consider the case where a designer enters a condition "if the customer is an old customer," and there is already a condition of "if the customer is a new customer" defined for the application being created. If that is the case, the interface design tool might recognize that the condition being entered differs from the previous condition only in substitution of an antonym (i.e., replacing "new" with "old"), and suggest that the designer use the business rule "if NOT(the customer is a new customer)", rather than creating a new, and independent business rule. Similarly, such an interface might provide designers with lists of existing variables, thereby avoiding situations where different terms are used for the same concept (e.g., "balance" and "account balance"). Of course, it is also possible that some implementations might include both specialized interfaces for creating conditions and perform parsing on those conditions once they are created. As a result, the presentation of the options above as alternatives should be understood as being illustrative only, and should not be treated as limiting on the protection accorded by this document, or by any documents claiming the benefit of this document.

As will be apparent to those of ordinary skill in the art, regardless of how test scripts and data are generated, it is likely that there will be a large number of scripts necessary to test even a moderately complicated application. As a result, many systems implemented according to this disclosure will include components that can help manage application testing. One example of such a component is a specialized set of routines, referred to as a PathRunner, which can be used as an interface to manage tests, as well as to run the testing itself. In terms of managing tests, in some implementations, a PathRunner could be configured to support selection and naming of subsets of test scripts for execution. This could allow for test subsets (which could be created automatically based on pre-set parameters, or by a human tester) to be executed in batch to support periodic (e.g., nightly) regression testing, smoke testing, or other types of focused testing (e.g., testing of a particular branch of a dialog, or testing of particular functionality, such as jumping to the main menu from other dialog states). Similarly, in some implementations, a PathRunner could support breakpoint testing, where automated scripts could be used to quickly reach a specified point in a dialog, at which time a human tester could take over, perhaps to help diagnose a potential error which had been identified by earlier testing. A PathRunner could also be used in the evaluation of tests. For example, in some implementations, a PathRunner could automatically compare audit logs of dialogs with the expected steps from a test script, and then present the results to a user in forms such as pass/fail statistics, lists of failed test cases (and steps that failed) or side by side comparisons of scripts and audit logs to assist in identifying problems with the application being tested. These evaluation results could also be stored in a database, which would allow them to be reviewed (and perhaps have the appropriate scripts re-run once the underlying problem is believed to be fixed) at a later date.

Figure 4:
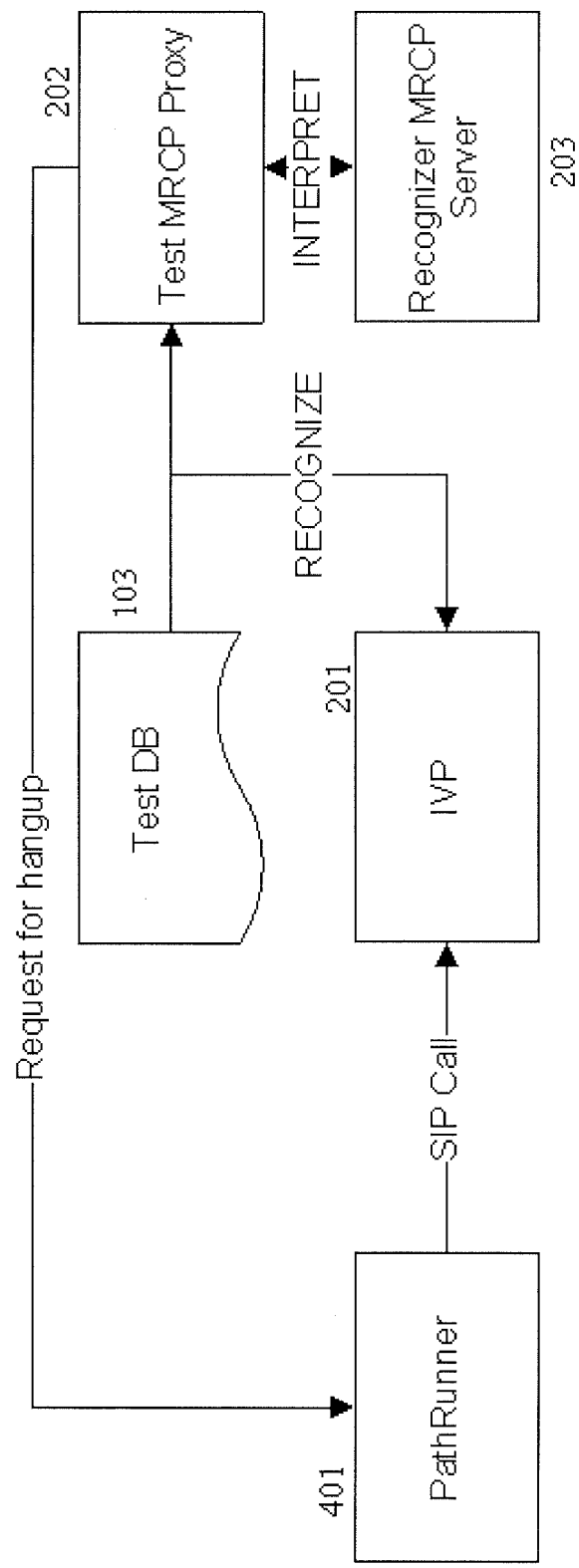
FIG. 4 depicts how, in some implementations, a PathRunner can be involved in test execution.

With respect to using a PathRunner in actual performance of tests, FIG. 4 shows how, in some implementations, a PathRunner can be involved in test execution. In particular, the PathRunner [401] can be responsible for actually initiating a call to the interactive voice platform [201], for example, by using the session initiation protocol ("SIP"). Once the call is under way, the testing would proceed as described previously with respect to FIGS. 1 and 2. That is, when the interactive voice platform [201] needed to handle user input (or, more accurately, when it would need to handle user input during deployment, since, during testing, there might not be actual user input provided) it would send a recognition request to a proxy MRCP server [202], which would translate it to an interpretation request for an actual MCRP server [203] using information from a test database [103]. Similarly, when the interactive voice platform [201] required evaluation of a business rule, it could request that evaluation to be performed by a gatekeeper (not shown in FIG. 4), which would use test data to provide the appropriate response based on the test script being run. The test could then be terminated when the interactive voice platform [201] disconnects (e.g., because the user has indicated that a transaction is complete), or when the test script being executed indicates that a user initiated termination (e.g., a HANGUP) is appropriate. In the later case, termination of the test could be achieved by the proxy MRCP server [202], which is the component normally responsible for providing simulated user inputs.

A PathRunner [401] can also be configured to assist a user in preparing for tests. For example, in many instances, an interactive voice platform [201] will be capable of running (or may be used to run) many different voice user interface applications. In such instances, the PathRunner [401] could provide an interface which would allow a user to select an application for testing, which application would then be loaded onto the interactive voice platform [201]. The PathRunner [401] may also be used to help configure the voice user interface application for testing, for example, by specifying that the interactive voice platform [201] should communicate with the proxy MRCP server [202] rather than with the MRCP server [203] that would be used during deployment. Similarly, in some instances, the PathRunner [401] could be configured to actually populate a testing database [103] used by the gatekeeper or the MRCP proxy server [202]. For example, the PathRunner [401] could, in the case where the testing database [103] was organized as a relational database, extract test data and simulated user input from the scripts being tested and use that information to populate the database tables. As a result, it should be understood that the PathRunner [401] as described previously is intended to be illustrative only of how such a component might be implemented in some systems, and should not be treated as implying limitations on the protection afforded by this document, or by any document claiming the benefit of this document.

In addition to variations in the functions of different components used to implement the technology described herein, there are also broad variations in the types of hardware systems which different implementations could utilize. For example, the activities described with respect to generation of test cases could be performed using a processor which would retrieve instructions corresponding to those activities from a memory (e.g., a hard drive, solid state memory, optical memory, or other types of devices which could store information so that it could be retrieved at some later time), execute them, and, based on that execution manipulate the values of data stored in the memory (e.g., by creating files storing test scripts). This processor could be part of a single system that would perform all activities as described above, could be part of a multi-processor system, or could even be part of a multi-computer system, in the case where the cooperative efforts of different types of computer systems were pooled to implement the technology described herein.

While the above disclosure has set forth various examples of how the inventors' technology (or various aspects thereof) could be implemented, it should be understood that those examples are intended to be illustrative only, and not limiting. Accordingly, instead of limiting the protection accorded by this document, or by any document which is related to this document, to the material explicitly disclosed herein, the protection should be understood to be defined by the following claims, which are drafted to reflect the scope of protection sought by the inventors in this document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to the claims based on the above disclosure or the incorporated priority documents is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

Explicit Definitions:

When used in the claims, an "application" should be understood to refer to a program which performs a specific function or functions. For example, Microsoft WORD is a type of "application" which has the functions of allowing a user to create new documents, and allowing a user to retrieve and edit already existing documents.

When used in the claims, a "back end system" should be understood to refer to systems, such as databases or servers, which may be used to support interactions with users, but which do not directly interact with users themselves.

When used in the claims, "based on" should be understood to mean that something is determined at least in part by the thing that it is indicated as being "based on." When something is completely determined by a thing, it will be described as being "based EXCLUSIVELY on" the thing.

When used in the claims, a "business rule" should be understood to refer to a statement which is logically meaningful to a business, but which is treated essentially as a placeholder for testing purposes.

When used in the claims, the "cardinality" of a set should be understood to refer to the number of elements in the set.

When used in the claims, a "comparison" should be understood to refer to a determination of similarities and/or differences between two or more things.

When used in the claims, a "computer" should be understood to refer to a device or group of devices which is capable of performing one or more logical and/or physical operations on data to produce a result.

When used in the claims, "computer executable instructions" should be understood to refer to data which can be used to specify physical or logical operations which can be performed by a computer.

When used in the claims, a "computer readable medium" should be understood to mean any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space.

When used in the claims, a "condition" should be understood to refer to something which acts as a trigger for something else. For example, if a prompt is played only for a new customer, then the caller being a new customer is a condition which, if satisfied (along with the caller being in the right state), will result in the prompt being played.

When used in the claims, the act of "configuring" a computer should be understood to mean providing the computer with specific data (which may include instructions) which can be used in performing the specific acts the computer is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

When used in the claims, a statement that there is a "connection" between states should be understood to mean that a user can move from one state to a state it is "connected" to without having to move through any other intervening states.

When used in the claims, "coordinating" things should be understood to refer to the act of identifying things as corresponding to each other.

When used in the claims, a statement that something "corresponds" to something else should be understood to mean that the thing has a 1:1 or MANY:1 relationship with the thing it "corresponds" to.

When used in the claims, to "create" something should be understood to mean causing that thing to come into being.

When used in the claims, "data" should be understood to mean information which is represented in a form which is capable of being processed, stored and/or transmitted.

When used in the claims, a "database" should be understood to refer to a collection of data stored on a computer readable medium in a manner such that the data can be retrieved by a computer. The term "database" can also be used to refer to the computer readable medium itself (e.g., a physical object which stores the data) based on the context.

When used in the claims, a "discrepancy" should be understood to refer to an instance of difference or inconsistency.

When used in the claims, "during" should be understood as a modifier indicating that an event takes place during a time in which another event is ongoing.

When used in the claims, an "evaluation request" for a condition should be understood to mean a request to determine whether or not the condition should be treated as satisfied.

When used in the claims, to "execute" an instruction should be understood to refer to the act of performing the operation called for by that instruction.

When used in the claims, a "gatekeeper" should be understood to refer to an application or module which serves an intermediary between an entity (e.g., another application or module) which requires some service from an external resource, and the external resource itself.

When used in the claims, an "initial state" should be understood to refer to a state in which an interaction begins, for example, a default state.

When used in the claims, to "initiate" something should be understood to refer to the act of beginning it, or setting it going.

When used in the claims, an "interactive voice platform" should be understood to refer to a system which is operable to support voice interactions with a user, and which is configured with data specifying actions the interactive voice platform should take during a voice interaction.

When used in the claims, an "interpretation request" should be understood to refer to a request to classify a linguistic input (e.g., a transcription of words spoken by a user) according to its meaning.

When used in the claims, a "label" should be understood to refer to a string of characters which can be used for identification.

When used in the claims, a "live interaction" should be understood to refer to an interaction which takes place between unaffiliated parties. For example, an interaction in which a member of the public calls an interactive voice response system in order to change his or her account data is a "live interaction." By contrast, a "test interaction" is one which takes place between affiliated parties (e.g., two systems owned or controlled by the same entity, a system owned by an entity who employs a human tester, etc) which is used to evaluate whether a party which will be responsible for the interaction (e.g., an interactive voice response system) is suitable for "live interactions."

When used in the claims, a "log" should be understood to refer a record of some activity or activities.

When used in the claims, a thing's "meaning" should be understood to refer to information conveyed by or included in the thing.

When used in the claims, a "means for generating a set of test data based on the set of data representing the voice user interface" should be understood as a means for performing the specified function of "generating a set of test data based on the set of data representing the voice user interface" under the provisions of 35 U.S.C. §112¶6. Algorithms which can be used to perform this function when used to configure a computer are described in, for example, the discussion of creating TESTDATA by exercising states in a voice user interface.

When used in the claims, a "means for generating a set of test scripts based on the set of data representing the voice user interface" should be understood as a means for performing the specified function of "generating a set of test scripts based on the set of data representing the voice user interface" under the provisions of 35 U.S.C. §112¶6. Algorithms which can be used to perform this function when used to configure a computer are described in, for example, the discussion of creating test scripts by tracing a graph of a voice user interface using a recursive search algorithm.

When used in the claims, a "means for providing data using a single interface during both test interactions and live interactions" should be understood as a means for performing the specified function of "providing data using a single interface during both test interactions and live interactions" under the provisions of 35 U.S.C. §112¶6. Algorithms which can be used to perform this function when used to configure a computer are described in, for example, the discussion of a gatekeeper which can provide a consistent interface for both live interactions and testing.

When used in the claims, a "means for responding to voice processing requests during test interactions based on simulated input" should be understood as a means for performing the specified function of "responding to voice processing requests during test interactions based on simulated input" under the provisions of 35 U.S.C. §112¶6. Algorithms which can be used to perform this function when used to configure a computer are described in, for example, the discussion of use of the proxy server in the context of FIG. 2.

When used in the claims, the verb "output" (and various forms thereof) should be understood to refer to the act of producing or turning out something. For example, "outputting an error" should be understood to include adding the error (or an indication thereof) to a log, displaying an error message on a user interface, setting an error flag, as well as similar acts.

When used in the claims, "perform" should be understood to refer to the act of starting and carrying something through.

When used in the claims, a "processor" should be understood to mean a device (or combination of devices) which can read instructions and perform operations (or cause operations to be performed) based on those instructions.

When used in the claims, a "proxy server" should be understood to refer to a device which stands in for an actual server and which provides responses to inputs which would otherwise be sent to the server. It should be understood that a proxy server can be implemented as a distinct physical device, or may be implemented as a process running on the same device that would be used as the server. An example of a proxy server is a server which serves as an intermediary between an application which requests data and a back end system which can provide responses to those requests.

When used in the claims, a "recognition request" should be understood to refer to a request for a voice input to be converted from spoken words to text.

When used in the claims, a statement that something "represents" something else should be understood to mean that one thing stands for the other in some context, or that one thing is equivalent to that which it "represents."

When used in the claims, a "rules engine" should be understood to refer to an application which configures a computer to be able to process and execute rules. It should be understood that the "rules engine" is used to execute arbitrary rules, which are not necessarily known at the time the "rules engine" is deployed, rather than simply executing hard coded rules which might be part of the "rules engine" itself.

When used in the claims, "running" an application should be understood to refer to the act of executing instructions for that application.

When used in the claims, "send" should be understood to refer to an entity or device making a thing available to one or more other entities or devices. It should be understood that the word sending does not imply that the entity or device sending a thing has a particular destination selected for that thing; thus, as used in this application, a message could be sent using the well known prior art method of writing the message on a piece of paper, placing the paper in a bottle, and throwing the bottle into the ocean. Of course, the above example is not intended to imply that the word sending is restricted to situations in which a destination is not known. Thus, sending a thing refers to making that thing available to one or more other devices or entities, regardless of whether those devices or entities are known or selected by sender.

When used in the claims, a "set" of things should be understood to refer to a number, group, or combination of zero or more things of similar nature, design, or function. When the "set" is not necessarily countable (e.g., a set of data) then the "set" should be understood to refer to an identifiable portion of the not necessarily countable thing (e.g., data).

When used in the claims, a "simulated input" should be understood to refer to an input which is used as a stand in for input that might be provided during a live interaction.

When used in the claims, a "state" should be understood to refer to a discrete logical location which defines a stage or condition.

When used in the claims, the verb "store" (and various forms thereof) should be understood to refer to the act of preserving or maintaining, however brief in duration that act might be.

When used in the claims, a "script" should be understood to refer to data that defines activities by one or more participants in an interaction. Similarly, a "test script" should be understood to refer to a script which defines activities in an interaction used to test or evaluate something (e.g., an application which is intended to support the interaction). In the claims, a "test script" will often be accompanied by "test data," which is data used to evaluate the thing being tested.

When used in the claims, "transforming" should be understood to refer to the act of changing a thing into something else, such as by deriving something from something else.

When used in the claims, the verb "use" (and various forms thereof) should be understood to mean employing the thing "used" for some purpose.

When used in the claims, a "voice processing request" should be understood to refer to a request to provide data in a form suitable for use by a computer system based on voice input provided by a user. It should be understood that, in a test interaction, a "voice processing request" might not actually be tied to voice input, but might instead be tied to a point in an interaction where voice input would be expected if the interaction were live.

When used in the claims, a "voice server" should be understood to refer to a server which is configured to respond to recognition requests by recognizing words in the input provided, and/or to respond to interpretation requests by determining the meaning of the linguistic input provided.

When used in the claims, a "voice user interface" should be understood to refer to a user facing portion of a system or application which allows the user to communicate with and/or control the system or application.

The invention claimed is:

1. A method comprising:
a) using a computer readable medium to store a set of data representing a voice user interface comprising a plurality of states, wherein the plurality of states comprises one or more states corresponding to one or more conditions, wherein each state from the plurality of states comprises a set of conditions from the one or more conditions;
b) based on executing a set of computer executable instructions by a processor:
   i) automatically creating a set of test scripts and a set of test data, the set of test data comprising each possible set of values for a set of business rules, the set of business rules corresponding to the one or more conditions, and each business rule from the set of business rules having possible values of true and false;
   ii) automatically testing the voice user interface with the set of test scripts and each possible set of values.

2. The method of claim 1, wherein the method comprises providing a voice user interface development environment operable to
a) allow a voice user interface designer to specify the one or more conditions as natural language text; and
b) automatically identify the set of business rules based on processing the natural language text.

3. The method of claim 2, wherein processing the natural language text comprises identifying a business rule as the converse of a condition specified using natural language text.

4. The method of claim 2, wherein processing the natural language text comprises identifying a logical operator in the natural language text.

5. The method of claim 4, further comprising identifying two or more business rules from portions of the condition specified as the natural language text comprising the identified logical operator.

6. The method of claim 5, wherein each of the two or more business rules has potential values consisting of true and false.

7. The method of claim 1, wherein:
i) the plurality of states comprises a first state comprising a first condition;
ii) creating the set of test scripts and the set of test data comprises creating a first business rule corresponding to the first condition;
iii) the set of test scripts comprises:
   a first test script corresponding to test data in which the first business rule is set to true; and,
   a second test script corresponding to test data in which the first business rule is set to false.

8. The method of claim 7, wherein creating the first business rule corresponding to the first condition is performed by transforming the first condition into a label without accounting for the first condition's meaning.

9. The method of claim 1, further comprising:
a) identifying a business rule by processing natural language text used by an interface designer to specify a condition, wherein processing the natural language text comprises identifying an expression comprising a variable and a conditional operator;
b) creating a first set of one or more test scripts corresponding to test data in which the variable's value causes the expression to evaluate to true; and
c) creating a second set of one or more test scripts corresponding to test data in which the variable's value causes the expression to evaluate to false.

10. The method of claim 1, wherein the set of test data comprises a numeric value for simulating an input from a user during testing.

11. A method comprising:
a) using a computer readable medium to store a set of data representing a voice user interface comprising a plurality of states, wherein the plurality of states comprises one or more states corresponding to one or more conditions, wherein each state from the plurality of states comprises a set of conditions from the one or more conditions;
b) automatically identifying a set of business rules having potential values consisting of true and false by processing natural language text used by a voice user interface designer to specify the one or more conditions;

c) based on executing a set of computer executable instructions by a processor, for each business rule from the set of business rules having potential values consisting of true and false, automatically creating:
  i) a set of one or more test scripts corresponding to test data in which the business rule is set to true; and
  ii) a set of one or more test scripts corresponding to test data in which the business title is set to false.

12. The method of claim 11, wherein automatically identifying the set of business rules having potential values consisting of true and false comprises, for a condition from the one or more conditions:
  a) identifying a logical operator in the natural language text used to specify the condition;
  b) identifying a first business rule corresponding to a first portion of the natural language text, wherein the first portion of the natural language text precedes the logical operator; and
  c) identifying second business rule corresponding to a second portion of the natural language text, wherein the second portion of the natural language text follows the logical operator.

13. The method of claim 11, wherein automatically identifying the set of business rules having potential values consisting of true and false comprises, for a business rule from the set of business rules, automatically creating the business rule by transforming a condition from the one or more conditions into a label without accounting for the condition's meaning.

14. The method of claim 11, further comprising:
  a) automatically identifying a business rule in a condition comprising an expression comprising a variable and a conditional operator, and
  b) creating a first set of one or more test scripts corresponding to test data in which the variable's value causes the expression to evaluate to true; and
  c) creating a second set of one or more test scripts corresponding to test data in which the variable's value causes the expression to evaluate to false.

* * * * *